US010384435B2

(12) United States Patent
Thorson et al.

(10) Patent No.: US 10,384,435 B2
(45) Date of Patent: Aug. 20, 2019

(54) 3D PRINTING

(71) Applicant: Caterpillar Inc., Peoria, IL (US)

(72) Inventors: Timothy Thorson, Morton, IL (US);
Thierry A. Marchione, Heber City, UT (US)

(73) Assignee: Caterpillar Inc., Deerfield, IL (US)

( * ) Notice: Subject to any disclaimer, the term of this patent is extended or adjusted under 35 U.S.C. 154(b) by 567 days.

(21) Appl. No.: 14/987,516

(22) Filed: Jan. 4, 2016

(65) Prior Publication Data

US 2017/0190112 A1   Jul. 6, 2017

(51) Int. Cl.
| | |
|---|---|
| *B29C 64/241* | (2017.01) |
| *B33Y 10/00* | (2015.01) |
| *B33Y 30/00* | (2015.01) |
| *B33Y 50/00* | (2015.01) |
| *B29C 64/153* | (2017.01) |

(52) U.S. Cl.
CPC ............ *B33Y 10/00* (2014.12); *B29C 64/153* (2017.08); *B29C 64/241* (2017.08); *B33Y 30/00* (2014.12); *B33Y 50/00* (2014.12)

(58) Field of Classification Search
CPC ... B29C 64/153; B29C 64/141; B29C 64/205; B29C 64/227; B29C 64/393
See application file for complete search history.

(56) References Cited

U.S. PATENT DOCUMENTS

| | | |
|---|---|---|
| 5,387,380 A | 2/1995 | Cima et al. |
| 7,291,002 B2 | 11/2007 | Russell et al. |
| 8,047,251 B2 | 11/2011 | Khoshnevis |
| 2007/0026145 A1* | 2/2007 | Lindemann ........... B29C 64/153 427/248.1 |
| 2013/0264750 A1 | 10/2013 | Hofacker et al. |
| 2017/0072466 A1* | 3/2017 | Zehavi ................... B29C 64/40 |

FOREIGN PATENT DOCUMENTS

CN          104325645 A          2/2015

* cited by examiner

*Primary Examiner* — Peter L Vajda
(74) *Attorney, Agent, or Firm* — Miller, Matthias & Hull

(57) ABSTRACT

A system and method for Selective Laser Fusing of a 3D part is disclosed. The system may comprise a platform, a gantry, a dispenser, a first press, a laser configured to emit a laser beam onto powdered material, a positive pressure chamber at least partially surrounding the laser, and a controller. The controller may be configured to: (a) receive data that includes a representation of the 3D part sliced into a plurality of layers; (b) rotate on a path about an axis either the platform or simultaneously each of the dispenser, the first press, the positive pressure chamber and the laser; (c) activate the dispenser to deposit the powdered material during (b); (d) activate the laser to emit during (b) the laser beam onto the powdered material to Fuse the powdered material into a layer of the plurality of layers; and (e) repeat (b)-(d) to make the 3D part.

19 Claims, 5 Drawing Sheets

3D PRINTING

TECHNICAL FIELD

The present disclosure relates to additive manufacturing and, more particularly, to additive manufacturing of large annular or contoured parts.

BACKGROUND

Additive manufacturing methods may include 3D printing techniques such as selective laser sintering or selective laser melting in which a 3D part is produced layer by layer by irradiating with a laser beam a powder bed of material contained within a chamber. Selective laser sintering uses a laser to sinter material together. Selective laser melting is similar but uses a laser to fully melt (rather than sinter) the material together, thus allowing for different properties such as crystal structure, porosity and the like. As used herein selective laser sintering and selective laser melting may be referred to, collectively, as "Selective Laser Fusing." Similarly, as used herein, sintering and melting may be collectively referred to as "Fusing" or "Fuse" or "Fused."

For Selective Laser Fusing, the digital representation of the 3D part is sliced into multiple (typically horizontal) layers. For each sliced layer, a path is generated along which the laser beam selectively moves to Fuse powdered material spread across a bed of material in a chamber. After each layer is completed, the bed of powdered material is lowered by one layer thickness, a new layer of powdered material is applied on top of the bed, and the process is repeated until the part is completed.

Parts, and in particular relatively large diameter contoured or annular parts, with relatively thin cross-sections may be difficult to manufacture using conventional methods. For example, an annular part such as a duo-cone seal (face seal) that has a large diameter and a thin cross-section may be difficult to manufacture using conventional methods. While such a part may benefit from additive manufacturing that uses 3D printing techniques such as selective laser sintering or selective laser melting, the large diameters of such parts make the use of such techniques difficult to implement on a production scale while maintaining consistency and quality for the part.

US Publication No. 2013/0264750 discloses a method and a device to perform selective laser sintering. The device includes a rotatable powder delivery unit and a stationary laser. Mirror mechanisms are used to deflect the laser beams to guide the laser beams over the surface of the powder bed. While beneficial, a better system is needed.

SUMMARY OF THE DISCLOSURE

In accordance with one aspect of the disclosure, a system for Selective Laser Fusing of a 3D part is disclosed. The system may comprise a platform moveable in at least one degree of freedom, a gantry, a dispenser attached to the gantry and configured to deposit powdered material on top of the platform, a first press attached to the gantry and configured to spread the powdered material deposited by the dispenser, a laser attached to the gantry and configured to emit a laser beam onto the powdered material, a positive pressure chamber at least partially surrounding the laser, and a controller. The positive pressure chamber has a cavity in which the laser is disposed. The positive pressure chamber is configured to fill the cavity with shielding gas. The controller may be configured to: (a) receive data that includes a representation of the 3D part sliced into a plurality of layers; (b) rotate on a path about an axis either the platform or simultaneously each of the dispenser, the first press, the positive pressure chamber and the laser; (c) activate the dispenser to deposit the powdered material during (b); (d) activate the laser to emit during (b) the laser beam onto the powdered material to Fuse the powdered material into a layer of the plurality of layers; and (e) repeat (b)-(d) to make the 3D part.

In accordance with another aspect of the disclosure, a method for Selective Laser Fusing of a 3D part is disclosed. The method may comprise (a) rotating, by a controller, simultaneously on a path around an axis a dispenser, a first press, a positive pressure chamber and a laser; (b) depositing by the dispenser a powdered material during (a); (c) spreading by the first press during (a) the powdered material; (d) emitting a laser beam onto the powdered material during (a) to Fuse a layer of the powdered material; and (e) repeating (a)-(d) to form the 3D part. The laser is disposed inside a cavity defined by the positive pressure chamber. In an embodiment, the laser follows a rotation of the dispenser about the axis.

In accordance with a further aspect of the disclosure, a system for Selective Laser Fusing of a 3D part is disclosed. The system may comprise a platform moveable in at least one degree of freedom, a housing, the housing and the platform defining a chamber, a gantry disposed inside the chamber above the platform, the platform movable along an axis, a plate disposed on the platform inside the chamber, an outer retaining wall and an inner retaining wall, a dispenser suspended from the gantry and rotatable about the axis, a first press integral with the dispenser, a laser suspended from the gantry and rotatable about the axis, a positive pressure chamber at least partially surrounding the laser, and a controller. The dispenser is configured to deposit powdered material. The first press is configured to spread the powdered material deposited by the dispenser. The outer retaining wall and the inner retaining wall may each be disposed on the plate. The outer retaining wall may encircle the inner retaining wall. The laser may be configured to emit a laser beam directly onto the powdered material. The positive pressure chamber having a cavity in which the laser is disposed. The positive pressure chamber is configured to fill the cavity with shielding gas. The controller may be configured to: (a) receive data that includes a representation of the 3D part sliced into a plurality of layers; (b) rotate simultaneously the dispenser, the first press, the positive pressure chamber and the laser on a path around the axis; (c) activate the dispenser to deposit the powdered material during (b); (d) activate the laser to emit during (b) the laser beam onto the powdered material to Fuse the powdered material into a layer of the plurality of layers; (e) move the platform in a direction along the axis; and (f) repeat (b)-(e) to form the 3D part.

DETAILED DESCRIPTION

Figure 1:
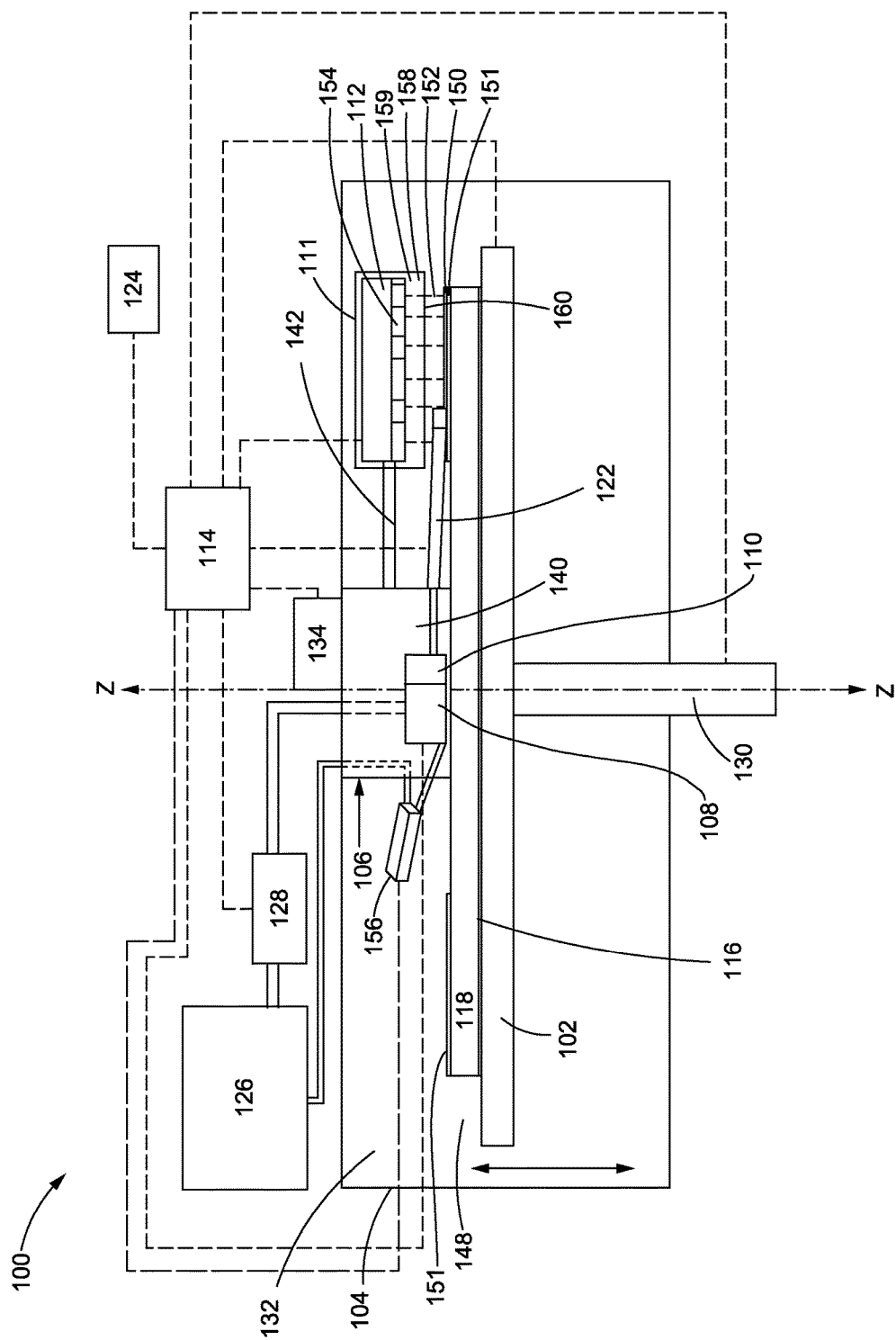
FIG. 1 is an embodiment of a schematic diagram of a system according to this disclosure.

FIG. 1 is an embodiment of a schematic diagram of a system 100 according to this disclosure. While this disclosure is provided with reference to the manufacturing of a duo cone seal, and in particular a duo cone seal with a large diameter, it will be understood that the teachings of this disclosure may be employed with equal efficacy in conjunction with other parts or assemblies such as rings, gears or the like. The teachings of this disclosure may also be used with other parts that are not annular in shape.

The system 100 may include a platform 102, a housing 104, a gantry 106, a dispenser 108, a first press 110, a laser 112, a positive pressure chamber 111 and a controller 114. The system 100 may include a plate 116. The system 100 may also include an outer retaining wall 118 and an inner retaining wall 120. In some embodiments, the system 100 may include a second press 122. The system 100 may also include a user interface 124, a powder repository 126 and a powder feed 128. In some embodiments, the system 100 may also include a vacuum unit 156.

Figure 2:
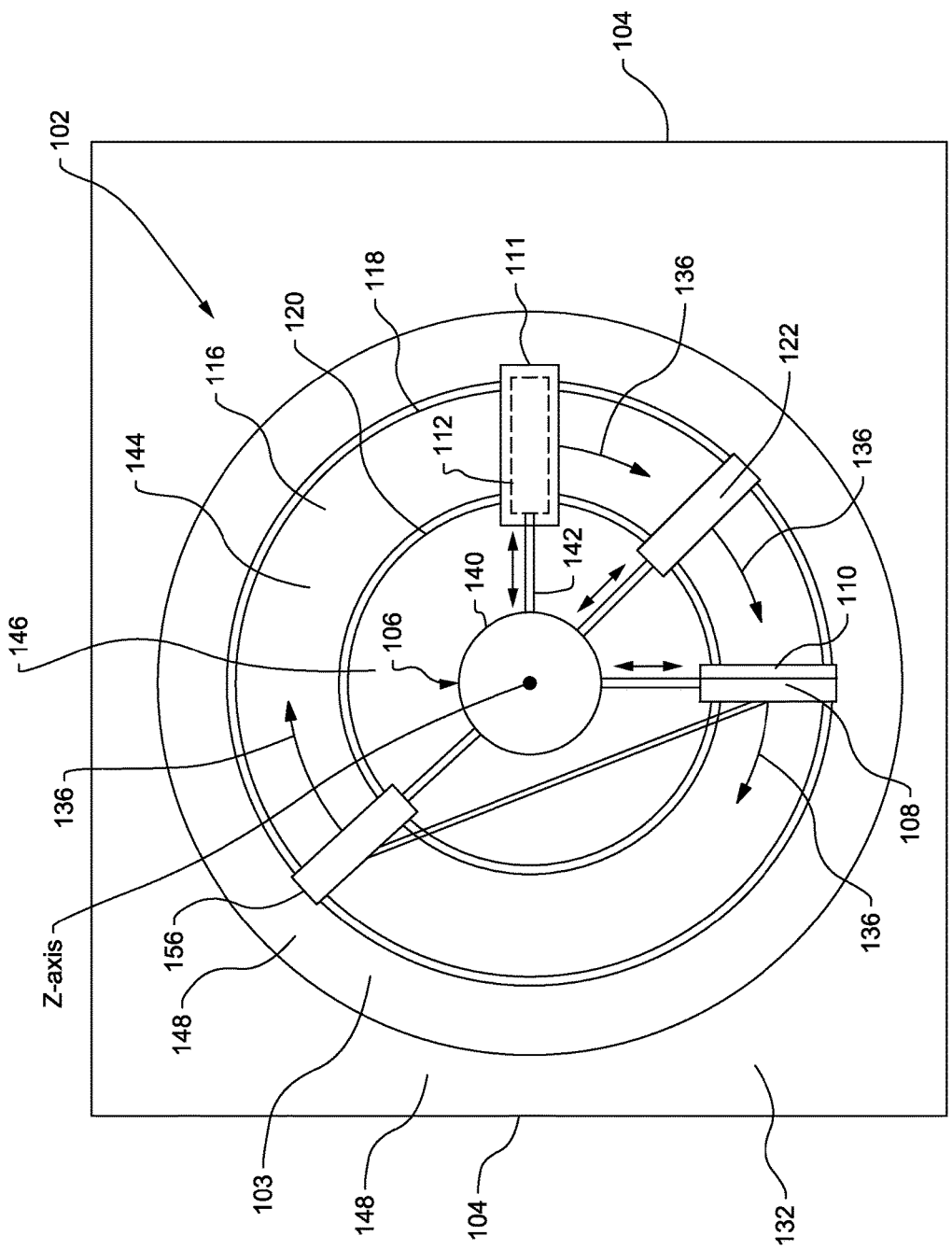
FIG. 2 is a top view of a gantry, dispenser, first press, laser, second press, positive pressure chamber, vacuum unit, plate and platform of FIG. 1.

The platform 102 may be movable in at least one degree of freedom. The platform 102 may include a lift 130, or the like, configured to move the platform 102. For example, the platform 102 may be moveable in a direction along an axis (for the purposes of discussion herein, a "Z-axis"). In some embodiments, the platform 102 or a portion 103 (see FIG. 2) of the platform 102 may be rotatable about the axis, for example, rotatable about the Z-axis. In some embodiments, some or all of the platform 102 may be moveable in at least two degrees of freedom. For example, in such an embodiment, the platform 102 (or a portion 103 of the platform 102) may be rotatable about the Z-axis and moveable vertically in a direction along the Z-axis.

The housing 104 may be disposed over the platform 102. The housing 104 and the platform 102 may define a chamber 132.

The gantry 106 may be disposed inside the chamber 132 or partially inside the chamber 132. In some embodiments, the gantry 106 may include a motor 134, or the like, and may be configured to simultaneously rotate on a path 136 about the axis (for example, the Z-axis) the dispenser 108, the first press 110, the laser 112, and the positive pressure chamber 111. If the system 100 includes the second press 122 or the vacuum unit 156, the gantry 106 may also be configured to rotate the second press 122 or vacuum unit 156 simultaneously with the dispenser 108, the first press 110, the laser 112 and the positive pressure chamber 111 on a path 136 about the axis (for example, the Z-axis). In an embodiment, the gantry 106 may be configured to rotate as described above in one direction, either clockwise or counterclockwise. In another embodiment, the gantry 106 may be configured to rotate as described above both in the clockwise direction and in the counterclockwise direction. In alternative embodiments, the gantry 106 may not be rotatable. In some embodiments, the gantry 106 may be stationary or the gantry 106 may raise and lower, in relation to the platform 102 (in a direction along the Z-axis), the dispenser 108, the first press 110, the laser 112, the positive pressure chamber 111 and, if part of the system 100, the second press 122 and/or the vacuum unit 156.

Figure 4:
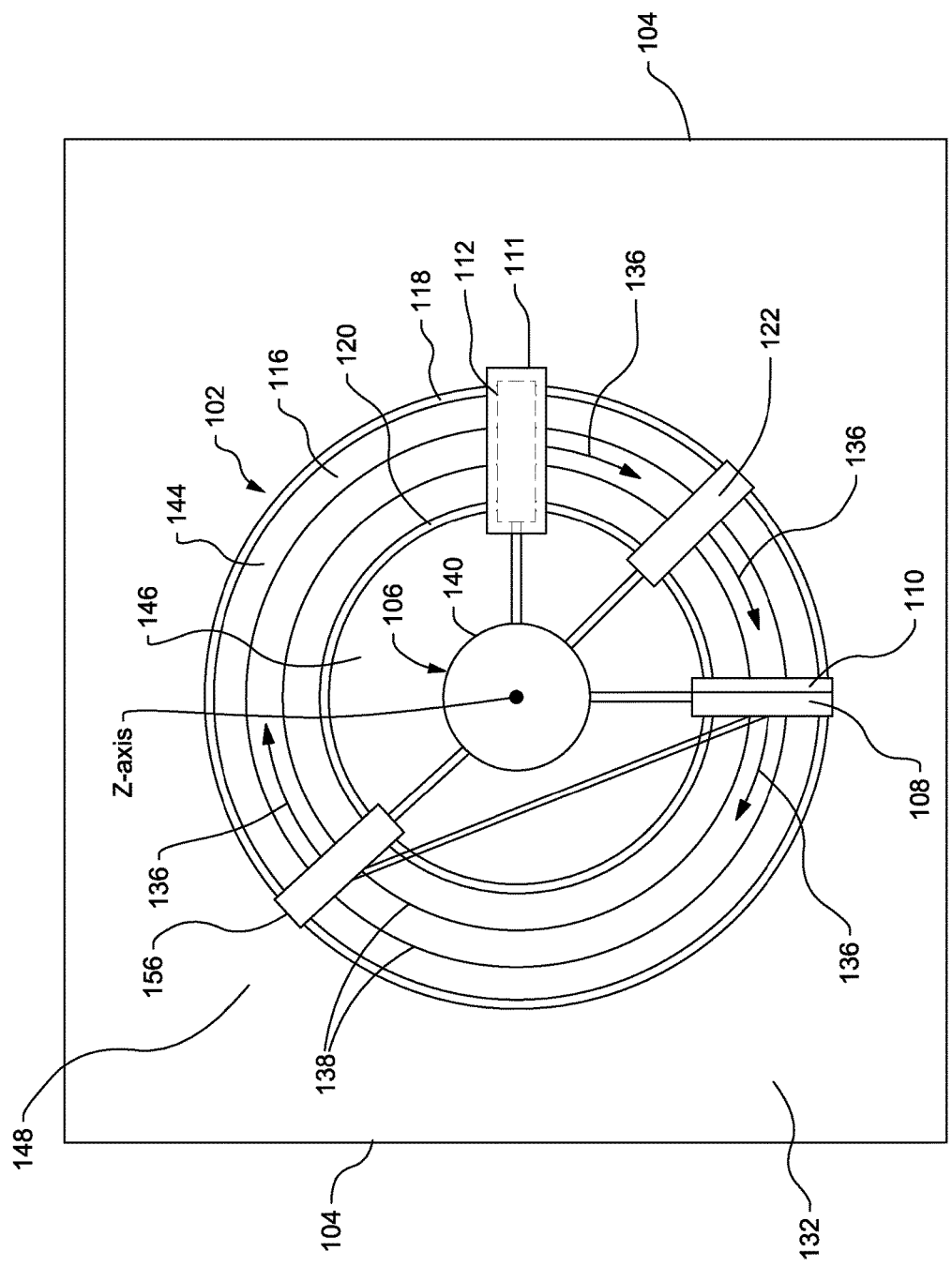
FIG. 4 is a top view of an exemplary embodiment of a portion of an exemplary gantry that includes rails.

The gantry 106 may be any type of appropriate gantry known in the art. In the embodiment shown in FIGS. 1-2, the gantry 106 may include a drive shaft 140 extending in a direction along the axis (for example, the Z-axis). Such drive shaft 140 may extend downward from the top of the chamber 132 (as shown in FIG. 1) or upward from the platform 102. In the embodiment shown in FIG. 1, the gantry 106 includes a plurality of arms 142 and the dispenser 108, the first press 110, the laser 112, the positive pressure chamber 111, the second press 122 and the vacuum unit 156 are suspended from the gantry 106 by the arms 142. In one embodiment, each such arm 142 may be moveable in a radial direction to adjust the radial position of the dispenser 108, the first press 110, the laser 112, the positive pressure chamber 111, the second press 122 and the vacuum unit 156 in relation to the drive shaft 140 or Z-axis. In an alternative variation shown in FIG. 4, the gantry 106 may be disposed above the platform 102 and may include one or more rails 138 along which the dispenser 108, the first press 110, the laser 112, and the positive pressure chamber 111 (and optionally, the second press 122 and/or vacuum unit 156) may move along a path 136 around the axis (for example, the Z-axis).

Turning back to FIGS. 1-2, the dispenser 108 is disposed above the platform 102. The dispenser 108 may be disposed over the plate 116. The dispenser 108 may be suspended from or otherwise attached to the gantry 106. In some embodiments the dispenser 108 may rotatable about the Z-axis via the gantry 106. In some embodiments, the dispenser 108 may also be moveable in the radial direction toward and away from the Z-axis. The dispenser 108 may be configured to receive the powdered material 144 (from a powder repository 126) and to deposit the powdered material 144 on top of the platform 102. The powder repository 126 may be disposed inside or outside of the chamber 132. In one embodiment, a powder feed 128 may pump or suction the powdered material 144 from the powder repository 126 into the dispenser 108 via a conduit. In some embodiments, but not all embodiments, the powder conduit may extend through a portion of the gantry 106, for example, through the drive shaft 140 or the like. The powdered material 144 may be comprised of small particles of metal, plastic, ceramic, or glass powders. In some embodiments in which the system 100 includes the vacuum unit 156, the dispenser 108 and/or the powder repository 126 may be configured to receive, via a conduit or the like, powdered material 144 from the vacuum unit 156.

The plate 116 may be disposed on the platform 102 below the dispenser 108, the first press 110, the laser 112, the positive pressure chamber 111 and, if included in the system 100, below the second press 122 and/or the vacuum unit 156. The plate 116 may be disposed inside the chamber 132. In one embodiment, but not all embodiments, the plate 116 may be generally planar and ring-shaped or annular. The plate 116 may be a portion of the finished 3D part 151, may be removable from the completed 3D part 151 or may be reusable.

Figure 3:
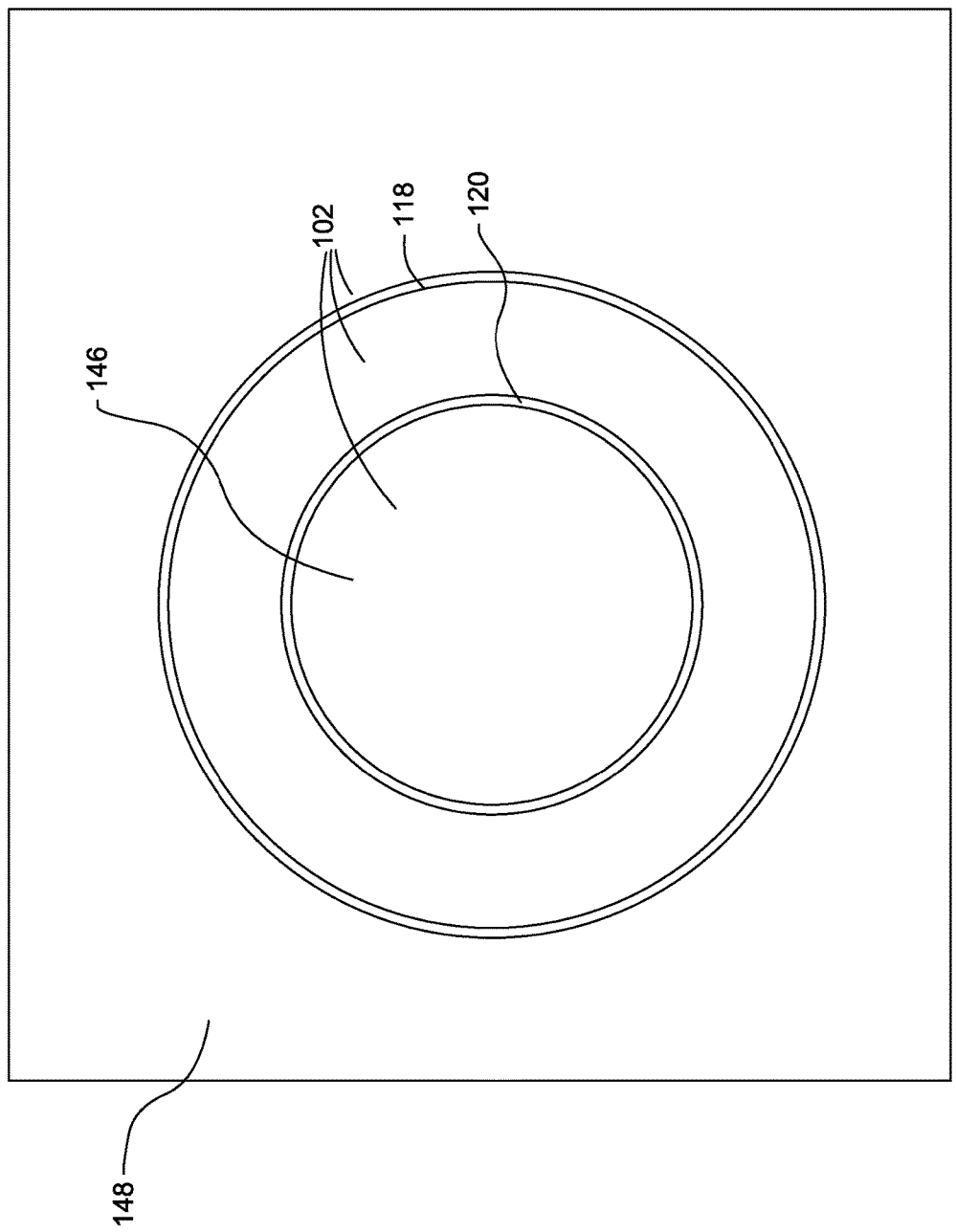
FIG. 3 is a top view of an exemplary embodiment in which the outer retaining wall and the inner retaining wall are disposed on the platform.

The outer retaining wall 118 may surround, or encircle, the inner retaining wall 120. The outer retaining wall 118 and the inner retaining wall 120 may both be disposed on top of the platform 102 either directly on the platform 102 (see FIG. 3) or indirectly (see FIGS. 1-2 and FIG. 4) on the platform 102 by virtue of the outer retaining wall 118 and the inner retaining wall 120 being disposed on top of the plate 116 (that is disposed on the platform 102). If disposed on top of the plate 116, the outer retaining wall 118 may be proximal to or may be the outermost perimeter of the 3D part 151, and the inner retaining wall 120 may be proximal to or may be the innermost perimeter of the 3D part 151. The outer retaining wall 118 and the inner retaining wall 120 may each be a portion of the finished 3D part 151, may be removable from the completed 3D part 151 or may be reusable. The inner retaining wall 120 defines a center area 146 of the platform 102.

In one embodiment, the outer retaining wall 118 and the inner retaining wall 120 may be disposed on the platform 102 or the plate 116 prior to the Selective Laser Fusing of the 3D part 151. Alternatively, the outer retaining wall 118 and/or the inner retaining wall 120 may be formed/Fused (printed) by Selective Laser Fusing on the platform 102 or on the top of the plate 116 by the system 100 and process/method disclosed herein during the Selective Laser Fusing (printing) of the desired 3D part 151.

In one embodiment of the system 100, the powdered material 144 may be deposited by the dispenser 108 inside and, in some cases on top of, the outer retaining wall 118 and the inner retaining wall 120 (and if a plate 116 is used, on top of the plate 116). However, the center area 146 of the platform 102 may be substantially free of the powdered material 144. Further, the outer area 148 of the platform 102 between the outer retaining wall 118 and the housing 104 may also be substantially free of the powdered material 144. In some embodiments, in which the outer retaining wall 118 and the inner retaining wall 120 are disposed on top of the plate 116, the platform 102 may be substantially free of direct contact by the powdered material 144 because the powdered material 144 is substantially retained on top of the plate 116 (for example, between the outer retaining wall 118 and the inner retaining wall 120). In other words, there may be substantially no powdered material 144 disposed on those areas of the platform 102 that are free of the plate 116, or alternatively, there may be substantially no powdered material 144 disposed on the outer area 148 of the platform 102 that is disposed radially outside of the outer retaining wall 118 and substantially no powdered material 144 disposed on the center area 146 (defined by the inner retaining wall 120).

In embodiments, in which the outer retaining wall 118 and the inner retaining wall 120 are Fused on the platform 102 (or plate 116) during the Selective Laser Fusing (printing) of the desired 3D part 151, the powdered material 144 may be deposited by the dispenser 108 on top of the platform 102 (or if desired, on top of the plate 116). In the initial iterations of the process (until the inner retaining wall 120 reaches a desired height), the center area 146 of the platform 102 may be substantially free of the powdered material 144 except for a small amount of overflow immediately adjacent to the inner retaining wall 120. Similarly, until the outer retaining wall 118 reaches a desired height, the outer area 148 of the platform 102 between the outer retaining wall 118 and the housing 104 may also be substantially free of the powdered material 144 except for a small amount of overflow immediately adjacent to the outer retaining wall 118.

The first press 110 is disposed above the platform 102. The first press 110 may be disposed over the plate 116. The first press 110 may be suspended from or otherwise attached to the gantry 106. In some embodiments, the first press 110 may be rotatable about the Z-axis via the gantry 106. In some embodiments, the first press 110 may also be moveable in the radial direction toward and away from the Z-axis. The first press 110 is configured to spread the powdered material 144 deposited by the dispenser 108 in a layer 150. In some embodiments, the first press 110 may also compact the powdered material 144. In an embodiment, the first press 110 may be connected to the dispenser 108. In another embodiment, the first press 110 may be integral with the dispenser 108. The first press 110 may be a blade, roller or the like.

The laser 112 is disposed above the platform 102. The laser 112 may be disposed inside the positive pressure chamber 111. The laser 112 may be suspended from or otherwise attached to the gantry 106. In some embodiments, the laser 112 may be rotatable about the Z-axis via the gantry 106. In some embodiments, the laser 112 may also be moveable (with the positive pressure chamber 111) in the radial direction toward and away from the Z-axis. In an embodiment, the laser 112 may include a laser head 154 through which a laser beam 152 is emitted. In another embodiment, the laser 112 may include a plurality of laser heads 154. In yet another embodiment, the laser 112 may be a vertical-cavity surface-emitting laser (VCSEL) in which the laser head 154 may include one or more semiconductor-based laser diodes. In a laser 112 that is a VCSEL, laser beam 152 emission is perpendicular from its top surface.

The laser 112 is configured to emit one or more laser beams 152 onto the powdered material 144. In some embodiments, mirrors or other reflective optic manipulation (as is known in the art) may be used to position the emitted laser beam(s) 152 on the powdered material 144. In alternative embodiments, the laser 112 may be configured to emit one or more laser beams 152 directly onto the powdered material 144. As used herein in the context of an emitted laser beam 152, "directly" means that the laser beam 152 is positioned onto the powdered material 144 without the use of reflection, or like optic manipulation. For example, in such embodiments, the laser beam 152 may be positioned onto the powdered material 144 without the use of mirrors or the like to direct the position of the emitted laser beam 152 to Fuse each (desired) portion of the layer 150 of powdered material 144 (e.g., a laser 112 such as a VCSEL semiconductor-based laser, or the like).

The system 100 also includes a positive pressure chamber 111 disposed above the platform 102 and over the laser 112 (partially surrounding the laser 112). The positive pressure chamber 111 has a cavity 158 inside which the laser 112 is disposed. The cavity 158 has an open mouth 160 through which the laser beam(s) 152 emitted by the laser 112 travel to reach the powdered material 144. In some embodiments, the mouth 160 of the positive pressure chamber 111 may be adjacent to the powdered material 144. However, there may be a gap between the positive pressure chamber 111 and the powdered material 144. The positive pressure chamber 111 may be suspended from or otherwise attached to the gantry 106. In some embodiments, the positive pressure chamber 111 (and laser 112) may be rotatable about the Z-axis via the gantry 106. In some embodiments, the positive pressure chamber 111 may also be moveable in the radial direction toward and away from the Z-axis. The positive pressure chamber 111, as is known in the art, provides a positive atmosphere for the emitted laser beam(s) 152. More specifically, the positive pressure chamber 111 is configured to emit shielding gas 159 that fills the cavity 158 of the positive pressure chamber 111 and deprives the cavity 158 of oxygen.

In embodiments that include the second press 122, the second press 122 is disposed above the platform 102. The second press 122 may be suspended from or otherwise attached to the gantry 106. In some embodiments, the second press 122 may be rotatable about the Z-axis via the gantry 106. In some embodiments, the second press 122 may also be moveable in the radial direction toward and away from the Z-axis. The second press 122 is configured to compact the powdered material 144. In an embodiment, the second press 122 may be a blade, roller or the like, as is known in the art. The second press 122 may be disposed between the first press 110 and the laser 112.

In embodiments that include the vacuum unit 156, the vacuum unit 156 is disposed above the platform 102. The vacuum unit 156 may be suspended from or otherwise attached to the gantry 106. In some embodiments, the vacuum unit 156 may be rotatable about the Z-axis via the gantry 106. In some embodiments, the vacuum unit 156 may also be moveable in the radial direction toward and away from the Z-axis. The vacuum unit 156 is configured to suction loose powdered material 144 from the chamber 132 after a layer 150 of the powdered material 144 has been Fused, and may also be configured to suction loose powdered material 144 prior to Fusing in order to reduce the volume of powdered material 144 between the outer retaining wall 118 and the inner retaining wall 120. The vacuum unit 156 may be operably connected to either the dispenser 108 or to the powder repository 126. The vacuum unit may further be configured to sieve the suctioned powdered material 144 prior providing such powdered material 144 to the dispenser 108 or to the powder repository 126.

The system 100 may include a controller 114 configured to (a) receive data that includes a representation of the 3D part 151 sliced into a plurality of layers 150, as is known in the art; (b) rotate on a path 136 about the axis (e.g., the Z-axis) either the platform 102 (and plate 116, if used) or simultaneously each of the dispenser 108, the first press 110, the positive pressure chamber 111 and the laser 112 (on the path 136 around the axis); (c) activate the dispenser 108 to deposit the powdered material 144 on either the platform 102 or the plate 116 during (b); (d) activate the laser 112 to emit during (b) the laser beam(s) 152 onto the powdered material 144 to Fuse the powdered material 144 into a layer 150 of the plurality of layers 150; (e) move the platform 102 in a direction (for example, a vertical direction) along the axis (Z-axis); and (f) repeat (b)-(e) to form the 3D part 151. If the system 100 includes the second press 122 or the vacuum unit 156, the controller 114 may be configured to rotate the second press 122 or the vacuum unit 156 simultaneously with the dispenser 108, the first press 110, positive pressure chamber 111 and the laser 112 on the path 136 around the axis (e.g., Z-axis). In an embodiment, the controller 114 may be configured to use polar coordinates, as is known in the art, to determine the position of the target powdered material 144 to be Fused by the laser beam(s) 152.

The controller 114 may be an electronic controller that operates in a logical fashion to perform operations, execute control algorithms, store and retrieve data and other desired operations. The controller 114 may include or access memory, secondary storage devices, processors, and any other components for running an application. The memory and secondary storage devices may be in the form of read-only memory (ROM) or random access memory (RAM) or integrated circuitry that is accessible by the controller 114. Various other circuits may be associated with the controller 114 such as power supply circuitry, signal conditioning circuitry, driver circuitry, and other types of circuitry.

The controller 114 may be a single controller or may include more than one controller disposed to control various functions and/or features of the system 100. The term "controller" is meant to be used in its broadest sense to include one or more controllers and/or microprocessors that may be associated with the system 100 and that may cooperate in controlling various functions and operations of the system 100. The functionality of the controller 114 may be implemented in hardware and/or software without regard to the functionality employed. The controller 114 may also use one or more data maps relating to the coordinate system used to position the dispenser 108, first press 110, second press 122, positive pressure chamber 111, laser 112 and vacuum unit 156 of the system 100. The data maps may be stored in the memory of the controller 114. The controller 114 may be configured to determine the relative position of the target powdered material 144 or the dispenser 108, the first press 110, positive pressure chamber 111, the laser 112, the second press 122 and vacuum unit 156 based using any methods known in the art. The controller 114 may detect the desired 3D part 151 to be made based on the commands from a user interface 124 in communication with the controller 114. The controller 114 may in some embodiments receive the data the includes the representation of the 3D part 151 sliced into a plurality of layers 150 from the user interface 124, or may receive information identifying the geometry of the 3D part 151 and may generate, using techniques known in the art, the plurality of layer 150 (slices) that make up the 3D part 151.

The controller 114 may be in operable communication with (and may activate) the gantry 106 (including the motor 134, if any) the dispenser 108, the positive pressure chamber 111, the laser 112, the platform 102 and/or (platform 102) lift 130 (which may move the platform 102 (e.g., vertically, rotationally, etc.)). The controller 114 may also be in operable communication with (and may activate) the powder feed 128, the first press 110, the second press 122 and the vacuum unit 156.

Also disclosed is a method of Selective Laser Fusing of a 3D part 151. The method may comprise (a) rotating, by a controller, on a path 136 about an axis either a platform 102 or simultaneously each of a dispenser 108, a first press 110, positive pressure chamber 111 and a laser 112, the laser 112 following the rotation of the dispenser 108 about the axis; (b) depositing by the dispenser 108 a powdered material 144 during (a); (c) spreading by the first press 110 during (a) the powdered material 144; (d) emitting (activating by a controller 114 a laser 112 to emit) a laser beam 152 onto the powdered material 144 during (a) to Fuse a layer 150 of the powdered material 144; and (e) repeating (a)-(d) to form the 3D part 151. The method may also include suctioning loose powdered material 144, by the vacuum unit 156, sieving the powdered material 144 and providing the powdered material 144 to either the dispenser 108 or to the powder repository 126 for reuse.

INDUSTRIAL APPLICABILITY

Figure 5:
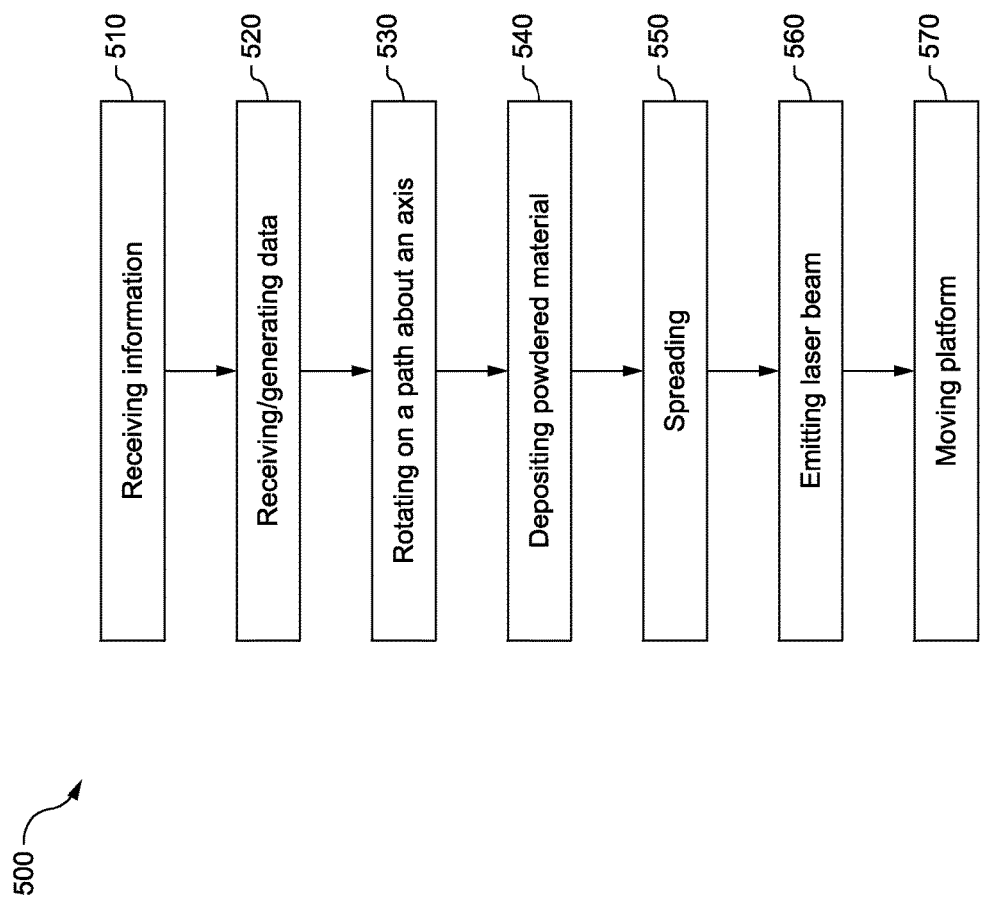
FIG. 5 is a flowchart of an exemplary method of controlling the system of FIG. 1.

FIG. 5 illustrates an exemplary method of Selective Laser Fusing of a 3D part 151. The method 500 will be explained in conjunction with the exemplary system 100 of FIG. 1.

In block 510, the method 500 includes receiving, by the controller 114, information on a 3D part 151 that is desired to be manufactured.

In block 520, the method 500 further includes receiving or generating data, by the controller 114, that includes the representation of the 3D part 151 (desired to be manufactured) sliced into a plurality of layers 150.

In block 530, the method 500 includes rotating (by the controller 114) on a path 136 about an axis (Z-axis) either a platform 102 or simultaneously each of the dispenser 108, the first press 110, the positive pressure chamber 111 and the laser 112, the laser 112 following the rotation of the dispenser 108 about the axis. In an embodiment that includes the second press 122, the second press 122 may also be rotated simultaneously (by the controller 114) with the dispenser 108, the first press 110, the positive pressure chamber 111 and the laser 112. In an embodiment that includes the vacuum unit 156, the vacuum unit 156 may also be rotated simultaneously (by the controller 114) with the dispenser 108, the first press 110, the positive pressure chamber 111 and the laser 112. In an embodiment, the controller 114 may activate the platform 102 or its lift 130 (or the like) to rotate the platform 102 about the axis (Z-axis). In an embodiment, the controller 114 may activate the gantry 106 (motor 134 or the like) to rotate simultaneously each of the dispenser 108, the first press 110, the positive pressure chamber 111 and the laser 112 (and second press 122 and/or vacuum unit 156, if included in the system 100). The controller 114 may determine the relative position of the target powdered material 144 or the position to which the dispenser 108, the first press 110, the positive pressure chamber 111, the laser 112, the second press 122 and vacuum unit 156 should be moved using any methods known in the art. In one embodiment, the controller 114 may utilize polar coordinates, as is known in the art, to determine the position of the target powdered material 144 to be Fused by the laser beam 152 and the position to which the dispenser 108, the first press 110, the positive pressure chamber 111, the laser 112, the second press 122 and the vacuum unit 156 should be moved.

In block 540, the method 500 includes depositing by the dispenser 108 a powdered material 144 during implementation of block 330. The depositing may be activated by the controller 114.

In block 550, the method 500 includes spreading by the first press 110 during implementation of block 330 the powdered material 144.

In block 560, the method 500 includes activating a laser 112, by the controller 114, to emit (one or more) laser beams 152 onto the powdered material 144 during implementation of block 330 to Fuse a layer 150 of the powdered material 144.

In block 570, the method may include, activating (in one embodiment, by a controller 114) the platform 102 or its lift 130 (or the like) to move the platform 102 in a direction along the Z-axis (raised or lowered) to allow for a new layer 150 of powdered material 144 to be deposited.

Block 530—block 570 are repeated until the 3D part 151 is formed.

The features disclosed herein may be particularly beneficial for improving quality and the cost of manufacturing parts, especially those with large diameters and thin cross-sections. As disclosed herein, the targeted area is filled with powdered material 144 instead of filling the entire platform 102. As a result, less powdered material 144 is wasted, and the operation is cleaner and more efficient. In addition, in some embodiments (but not all embodiments), the laser beam 152 may be applied directly on the powdered material 144 and may not use reflection, mirrors or other similar techniques to reach the outer diameter of the 3D part 151. Further the vacuum unit 156 may suction, sieve and provide excess powdered material 144 back to the dispenser 108 or the powder repository 126, thus making the operation cleaner and more cost effective.

While aspects of the present disclosure have been particularly shown and described with reference to the embodiments above, it will be understood by those skilled in the art that various additional embodiments may be contemplated by the modification of the disclosed system 100 and methods without departing from the spirit and scope of what is disclosed. Such embodiments should be understood to fall within the scope of the present disclosure as determined based upon the claims and any equivalents thereof.

What is claimed is:

1. A system for Selective Laser Fusing of a 3D part, the system comprising:
   a platform, the platform moveable in at least one degree of freedom;
   a gantry;
   a dispenser attached to the gantry and configured to deposit powdered material on top of the platform;
   a first press attached to the gantry and configured to spread the powdered material deposited by the dispenser;
   a laser attached to the gantry and configured to emit a laser beam onto the powdered material; and
   a controller configured to:
   (a) receive data that includes a representation of the 3D part sliced into a plurality of layers;
   (b) move one of the platform and the gantry vertically relative to the other of the platform and the gantry to allow for a new layer of the plurality of layers to be formed on the platform;
   (c) rotate at least one of the platform and the gantry about a vertical axis so that the dispenser, the first press and the laser move through a circular path relative to the platform;
   (d) activate the dispenser to deposit the powdered material during (c);
   (e) activate the laser to emit during (c) the laser beam onto the powdered material to Fuse the powdered material into the new layer of the plurality of layers; and
   (f) repeat (b)-(e) to make the 3D part.

2. The system of claim 1, further comprising a second press attached to the gantry and disposed between the first press and the laser, the second press configured to compact the powdered material.

3. The system of claim 1, further comprising an outer retaining wall and an inner retaining wall, each disposed above the platform, the outer retaining wall surrounding the inner retaining wall, the inner retaining wall defining a center area of the platform, wherein the center area is substantially free of powdered material.

4. The system of claim 1, wherein the platform is moveable in a direction along the vertical axis.

5. The system of claim 1, wherein the laser is configured to position, without the use of reflection, the laser beam to Fuse each portion of the layer.

6. The system of claim 1, wherein the controller is configured to use polar coordinates to determine a position of the powdered material to be Fused.

7. A method for Selective Laser Fusing of a 3D part, the method comprising:
   (a) moving, by a controller, one of a platform and a gantry vertically relative to the other of the platform and the gantry to allow for a new layer of a plurality of layers of the 3D part to be formed on the platform, wherein a dispenser, a first press, and a laser are suspended from the gantry;
   (b) rotating, by the controller, at least one of the platform and the gantry about a vertical axis so that the dispenser, the first press and the laser move through a circular path about the vertical axis relative to the platform;
   (c) depositing by the dispenser a powdered material during (b);
   (d) spreading by the first press during (b) the powdered material;

(e) emitting a laser beam onto the powdered material during (b) to Fuse a layer of the powdered material; and (f) repeating (a)-(e) to form the 3D part.

8. The method of claim 7, wherein the dispenser, the first press and the laser are each disposed over a plate and an outer retaining wall that encircles an inner retaining wall, the plate disposed on a platform and generally ring-shaped, the inner retaining wall and the outer retaining wall disposed on top of the plate, the inner retaining wall defining a center area of the platform, wherein after the depositing and before the emitting the center area is substantially free of the powdered material.

9. The method of claim 7, further including Fusing an outer retaining wall and an inner retaining wall during Fusing of a portion of the 3D part, the outer retaining wall encircling the inner retaining wall, the 3D part disposed between the outer retaining wall and the inner retaining wall.

10. The method of claim 7, further comprising receiving, by the controller, data that includes a representation of the 3D part sliced into a plurality of layers, each layer of (e) part of the plurality of layers.

11. The method of claim 7, in which the rotating further includes rotating a second press on the path around the vertical axis to compact the powdered material, the second press disposed between the first press and the laser.

12. The method of claim 7, wherein polar coordinates are used, by the controller, to determine a position of the target powdered material.

13. The method of claim 7, further comprising positioning the laser beam directly onto the powdered material without the use of reflection.

14. A system for Selective Laser Fusing of a 3D part, the system comprising:

a platform moveable in at least one degree of freedom;

a housing, the housing and the platform defining a chamber;

a gantry disposed inside the chamber above the platform, the platform movable along a vertical axis;

a plate disposed on the platform inside the chamber;

an outer retaining wall and an inner retaining wall, each disposed on the plate, the outer retaining wall encircling the inner retaining wall;

a dispenser suspended from the gantry, the dispenser configured to deposit powdered material;

a first press integral with the dispenser, the first press configured to spread the powdered material deposited by the dispenser;

a laser suspended from the gantry, the laser configured to emit a laser beam directly onto the powdered material; and a controller configured to:
  (a) receive data that includes a representation of the 3D part sliced into a plurality of layers;
  (b) rotate the gantry about the vertical axis so that the dispenser, the first press, and the laser move through a circular path around the vertical axis relative to the platform;
  (c) activate the dispenser to deposit the powdered material during (b);
  (d) activate the laser to emit during (b) the laser beam onto the powdered material to Fuse the powdered material into a layer of the plurality of layers;
  (e) move the platform in a direction along the vertical axis relative to the gantry to allow for a new layer of the plurality of layers to be formed on the platform; and
  (f) repeat (b)-(e) to form the 3D part.

15. The system of claim 14, further comprising a second press suspended from the gantry and rotatable on the path about the vertical axis, the second press disposed between the first press and the laser and configured to compress the powdered material.

16. The system of claim 14, wherein the platform is substantially free of direct contact by the powdered material.

17. The system of claim 14, wherein polar coordinates are used to determine a position of the target powdered material.

18. The system of claim 14, wherein the dispenser, the first press and the laser are movable in a radial direction relative to the vertical axis.

19. The system of claim 14, in which the laser may be a VCSEL semiconductor-based laser.

* * * * *